Sept. 26, 1961  B. J. LONG  3,001,313
UNDER-ICE FISHING DEVICE
Filed Feb. 11, 1960

INVENTOR.
BY BEN J. LONG
ATTORNEY 3,001,313
UNDER-ICE FISHING DEVICE
Ben J. Long, 4911 Osseo Road, Minneapolis, Minn.
Filed Feb. 11, 1960, Ser. No. 8,096
7 Claims. (Cl. 43—4)

This invention relates broadly to fishing tackle, more particularly to tackle for winter ice fishing, and specifically to a device by which the terminal tackle is advanced and retrieved under a sheet of ice to obviate the necessity of continually cutting exploratory fish holes in the ice to locate fish within a given area, and surrounding the initial fish hole cut in said ice sheet.

The principal object of this invention is to provide an under-ice fishing device that is inherently buoyant and consequently has an affinity for the under surfaces of an ice sheet on a lake or the like, said device being capable of being advanced or retrieved by manual manipulation from top-side the ice sheet while terminal tackle is suspended therefrom.

A further object of this invention is to provide an under-ice fishing device that while advancing terminal tackle under an ice sheet, said advancing movements will conversely impart life-like action to the lure forming a part of the terminal tackle.

A further object of this invention is to provide an under-ice fishing device wherein the terminal tackle may be secured thereto in an adjustable manner relative to water depth.

A still further object of this invention is to provide an under-ice fishing device that is capable of exploratory movement under the ice-sheet on a lake or the like and over a wide area via a single ice fishing hole.

These and other objects of this invention will become apparent from the following specification and claims when taken in conjunction with the accompanying drawings which form a part of this application, and in which drawings, like characters indicate like parts throughout the several views.

To the above end, generally stated, the invention consists of the following devices and combination of devices hereinafter described and defined in the claims.

Applicant is the patentee and owner of United States Letters Patent No. 2,904,919, dated September 22, 1959 and entitled, "Under-Ice Towing and Launching Device."

Referring to the drawings.

Figure 3:
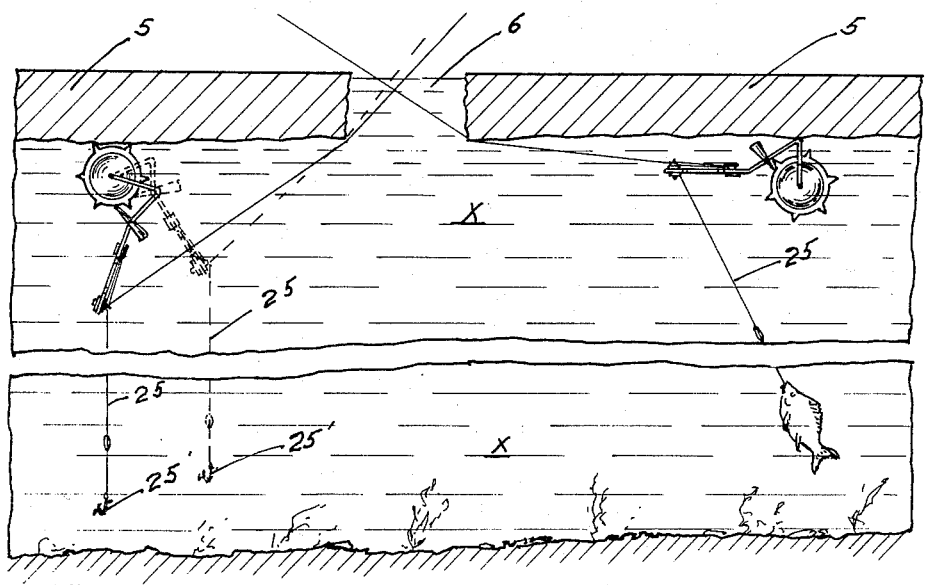
FIG. 3 is a view showing two of the subject devices wherein one is being moved away from an opening in an ice sheet and the other thereof being moved toward said opening.

With reference to FIGS. 3 and 4 it will be understood that in the interest of conserving space on the drawing, a single ice sheet is shown with a single fish hole therein and that FIG. 4 shows the retrieve of the same device being advanced in another direction in FIG. 3.

It is also important to note, see FIG. 3, that as the device is advanced under the ice sheet, by manipulation of the operating cord leading out of the fish hole, that such manipulation will raise and lower the lure on the terminal tackle relative to the lake bottom and impart life-like swimming action to said lure.

Referring specifically to the drawings, see FIGS. 3 and 4, the reference character X is directed to a body of water such as a lake or river having an ice sheet 5 with a conventional fish hole 6 cut in said ice sheet 5. Obviously a portion of the simulated water body is broken away as evidenced by the irregular lines running horizontally through the same.

The numeral 7 indicates a buoyant hollow cylindrical member that will hereinafter be referred to as the buoyant member in the interest of brevity and clarity, having convex end portions 8 with a bore 9 having a bushing, not shown, at the diametric center of each of said convex end portions, provided for a purpose that will presently become apparent. A plurality of transversely disposed upstanding lugs 10 are spaced at equi-distant points about the periphery of the buoyant member 7 and are preferably integral therewith.

A pair of wheels 11 having a plurality of sharp outstanding teeth 12, are transversely spaced apart and are rigidly affixed adjacent each convex outer end portion of the buoyant member 7 by a plurality of screws 13, said teeth in each of said wheels 11 being in transverse alignment when the said wheels 11 are secured to the buoyant member 7. It is also important to note that said teeth 12 are also in register with each of the transverse lugs 10.

A heavy wire mounting frame 14 is constructed and arranged to form a bail 15 the inner end of the side portions thereof, are journaled in the bores 9 in the convex end portions 8 of the buoyant member 7.

Figures 1, 2:
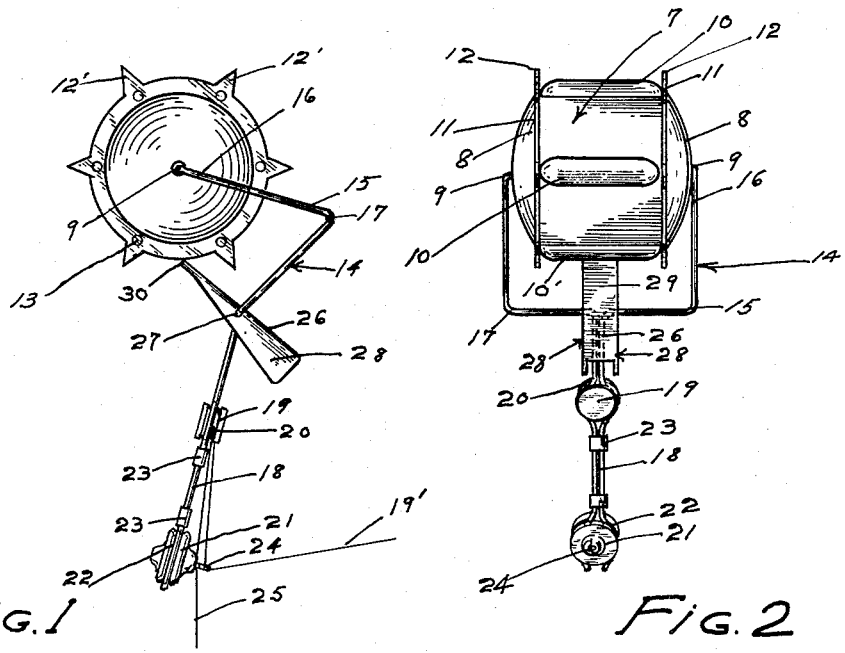
FIG. 1 is a side elevational view of the invention with terminal tackle, fish line and manipulating line attached but broken away.
FIG. 2 is an end elevational view of the same without the said fish and manipulating lines.

The bail 15 of the mounting frame 14 is dimensioned to overlie the said buoyant member 7, its mounted wheels 11 and the teeth 12 thereof to permit the free rotation of the same about a horizontal axis. As best shown in FIG. 1, it is important to note that the configuration of each leg of the bail 15 in end elevation is characterized by an acute angular bend which forms a pair of knees 17, the purpose of which will presently appear.

Substantially at the transverse center of the buoyant member 7 the outer end portions of the mounting frame 14 are bent rearwardly at a 180 degree angle to the overlying bail 15 and thence extend rearwardly in close fitting parallel arrangement. This parallel arrangement is to form a depending leg 18 for purposes that will also presently appear. This arrangement of the members of the leg 18 is interrupted at substantially the longitudinal center thereof at which point these members are separated to afford a mounting station for an anchor member 19 for attaching the actuating line 19' to the device. This anchor member 19 is provided with an annular groove 20 which is engaged by the members forming the leg 18. A similar mounting station for a weight member 21, which is also provided with an annular groove 22, is formed in the extreme outer end portion of the leg 18. A pair of metal clips 23 adjacent the line anchor member 19 and the weight member 21 are clamped around the members of the leg 18 to hold the same in parallel assembled arrangement with the said anchor and weight members held therebetween. In fact, the mounting frame 14 as an entirety is held in assembled relation by these metal clips 23. An eye 24 is formed in the weight member 21 to afford a guide for the actuating line 19'.

At this point it is important to note that the actuating line 19' is also used as the fishing line 25 to which the terminal tackle 25' is attached. To utilize this one line both as an actuating line and as a fishing line at various depths of water, a portion of the line 19' that will be called herein the free end portion, is fed through the eye 24 in the weight member 21 and thence wound securely around the anchor member 19 at a point in said line wherein the free end portion thereof will become the fishing line 25, the said point of winding the same on the anchor member 19 being of course determined by the depth at which the fisherman wants the terminal tackle 25' to operate.

A pawl 26 having the form of an inverted, inwardly tapered channel is loosely mounted, off-center, on the bail 15 by passing the latter through a pair of aligned bores 27 in the side members 28 of the pawl 26. In this off-center mounting arrangement of the said pawl 26 on the bail 15 the preponderance of inherent weight is to the rear thereof and accordingly when the pawl is free to rotate on its transverse axis when the device is in working position, said pawl will gird the depending leg 18 with its side portions 28 and its upper surface 29 respectively. It is noteworthy that the said upper surface of the pawl 26 when engaging the depending leg 18, will act as a stop to limit the full rotation of the pawl 26 about its said axis.

The formation of the lugs 10 on the buoyant member 7 actually makes a ratchet of this member which cooperates with the pawl 26. Said pawl is so dimensioned longitudinally that with the said buoyant member 7 engaging the under-ice sheet 5 with two pairs of teeth 12, the weight member 21 will cause the outer end portion of the bail 15 and the depending leg 18 to hang substantially downward with free pendulum-like suspension from the said buoyant member 7, said pawl will engage the ratchet in a manner that will presently appear. It is also important to note that the pawl 26 in projecting inwardly to its engagement with the body of the buoyant member 7, is of such length that its extreme forward end portion 30 will not clear the said body portion of the buoyant member 7 and is thus held positioned at all times for engagement with the lugs 10 on the buoyant member 7 which affords a cooperating ratchet for said pawl.

The device is activated into movement by the cooperating efforts of the pawl 26 acting on the lugs 10 of the buoyant member 7 and manual manipulation of the activating line 19'. A complete single operational cycle is as follows:

The device is placed under the ice sheet 5 covering a body of water X via a conventional fishing hole 6 by the fisherman. It will be assumed that the depth of the water body X has been ascertained and that the fishing line 25 with terminal tackle 25' attached has been adjusted to said depth and secured by winding the same around the anchor member 19. The actuating portion 19' of the line from its junction with the eye 24 in the weight member 21 is brought up through the fish hole 6 and placed on the upper surface of the ice sheet 5 adjacent said fish hole. It will be understood that the device itself has remained in position under the ice sheet slightly removed from the fish hole 6 and with two of its transversely opposed pairs of the teeth 12 of the wheels 11 in engagement with the said under ice surface.

To impart under ice crawling movements to the device, the fisherman carefully draws the actuating line 19' taut, by rearward pulling movement thus causing the bail 15 and its depending leg 18 to move about the horizontal axis of the bail on the arc of a circle and in so doing carries the pawl 26 upwardly and rearwardly until the same overrides the lowermost and rearwardly positioned lug 10'. Practice will teach the amount of line movement necessary and when the extreme forward portion 30 of the pawl 26 fully over-rides and clears the above noted lug 10', the tension of the actuating line 19' is relaxed by the fisherman and the force of gravity carries the bail 15 and its depending leg 18 back into normal depending vertical position. It will be obvious that as the bail and leg assembly moves downwardly and forwardly on the arc of a circle the pawl 26 mounted and carried thereby will engage the upper edge of the lug 10'. The action of the weighted bail and depending leg assembly, motivated by the force of gravity, will cause the pawl 15 to rotate the buoyant member 7 while the same is fulcrumed on the two opposed forwardmost teeth 12' of the wheel 11.

The lugs 10, the teeth 12, and the length of the forward end portion of the pawl 15 are constructed and dimensioned so as to impart enough movement to the buoyant member 7 whereby the same will move forwardly past the dead center of its fulcrum point so that the device will again assume normal stopped position while buoyantly held against the under surface of the ice sheet 5 on two pairs of opposed teeth.

It might be stated that the device moves at the completion of each single cycle of activation, substantially the distance between the points of successive teeth 12. Obviously, the distance can travel is limited only by the length of the activating line 19'.

After the device has transversed a given distance under the ice, or if a fish is hooked on the terminal tackle 25', the said device may be retrieved by a sustained rearward pull on the activating line. During this sustained pull, acting against the normal tendency of the weighted members to drop into depending position, the entire device rides under the ice sheet 5 to its rendezvous with the fish hole 6 only on the knees 17 of the bail 15. These knees are so constructed and dimensioned so as to hold the other portions of the device clear of engagement with the ice, and in fact, act as runners which afford a very easy retrieve and one which will not interfere with the playing of a hooked fish, however, in most of such cases, the action of the fish the entire device from engagement with the said ice sheet.

While there are herein disclosd but a limited number of embodiments of the structure, process and product of the invention herein presented, it is possible to produce still other embodiments without departing from the inventive concept herein disclosed, and it is desired, therefor, that only such limitations be imposed on the impended claims as are stated herein or required by the prior art.

I claim:

1. An under-ice fishing device comprising in combination, a mounting frame a pawl mounted on said frame, a buoyant member rotatably mounted in said frame, a pair of transversely opposed toothed wheels mounted on said buoyant member activated by an actuating and fishing line, ratchet means on the buoyant member cooperating with a pawl on the frame whereby the buoyant member is rotated by the action of the pawl thereon as the frame is manually activated to engage the pawl and the ratchet, and weight means on the frame to return the same to normal position after said frame has been manually actuated by an actuating and fishing line.

2. An under-ice fishing device comprising in combination, a mounting frame, in the form of a bail, an integral leg depending from said bail, a watertight buoyant member mounted on said frame for free rotatable movements about its horizontal axis, a pair of transversely opposed wheels rigidly secured one to each end portion of the said buoyant member, a plurality of sharp upstanding teeth having sharp points circumferentially disposed about the periphery of each of said wheels at equi-distant points, a plurality of equi-distant circumferentially disposed transversely elongated lugs integral with the buoyant member affording a ratchet, and a pawl cooperating with said ratchet and for engagement therewith, pivotally mounted on the bail, an elongated depending leg integral with said bail affording a mounting station for a weight member and an anchor member for a unitary fishing and actuating line.

3. The structure defined in claim 2 wherein the toothed wheels are of greater diameter than the buoyant member.

4. The structure defined in claim 2 wherein the outer end portions of the buoyant member are convex and are provided with horizontally disposed bores whereby said buoyant member is rotatably mounted on the frame.

5. The structure defined in claim 2 wherein each side portion of the bail is bent downwardly upon itself at an obtuse angle to afford a pair of knees that extend outwardly of the greatest diameter of the toothed wheels and the buoyant member.

6. An under-ice fishing device comprising in combination, a mounting frame in the form of an angular bail having side portions, and an end portion, an elongated leg depending substantially from the transverse center of the said end portion of the bail, a buoyant member having convex end portions and means for journaling the said side portions of the bail in each of said end portions, a plurality of transversely elongated equi-distant circumferentially spaced lugs formed integral in the periphery of the buoyant member said lugs affording a ratchet, a plurality of circumferentially disposed sharp teeth secured to the buoyant member adjacent each end portion thereof, a pawl in the form of an inwardly tapered inverted channel loosely mounted via transverse bores in said pawl on the end portion of the bail and with the preponderance of weight of said pawl being rearwardly of its mounting axis, the forward end portion of said pawl having engagement with the lugs on the buoyant member and a weight member secured to the depending leg at the outer end portion thereof to impart movement by gravity to the buoyant member when the pawl successively engages the lugs thereon while said buoyant member is held positioned against the under-ice surface and said depending leg and the bail are moved in the arc of a circle about the horizontal axis of the said buoyant member.

7. The structure defined in claim 6 wherein the teeth on the buoyant member are in transverse alignment at each end portion of each of said lugs on the buoyant member.

References Cited in the file of this patent

UNITED STATES PATENTS

| | | |
|---|---|---|
| 1,163,193 | Althoff | Dec. 7, 1915 |
| 2,734,300 | Mandel | Feb. 14, 1956 |
| 2,904,919 | Long | Sept. 22, 1959 |